(12) United States Patent
Zhang

(10) Patent No.: US 11,786,079 B2
(45) Date of Patent: Oct. 17, 2023

(54) POLYGONAL ONE-PIECE FOLDABLE WATER BASIN

(71) Applicant: Yongchang Zhang, Suzhou (CN)

(72) Inventor: Yongchang Zhang, Suzhou (CN)

(*) Notice: Subject to any disclaimer, the term of this patent is extended or adjusted under 35 U.S.C. 154(b) by 0 days.

(21) Appl. No.: 17/577,421

(22) Filed: Jan. 18, 2022

(65) Prior Publication Data
US 2023/0210313 A1 Jul. 6, 2023

(30) Foreign Application Priority Data
Dec. 31, 2021 (CN) .......................... 202123424796.8

(51) Int. Cl.
*A47K 3/062* (2006.01)
*A01K 13/00* (2006.01)

(52) U.S. Cl.
CPC ............ *A47K 3/062* (2013.01); *A01K 13/001* (2013.01)

(58) Field of Classification Search
CPC ........ A01K 13/001; A47K 3/06; A47K 3/062; A47K 3/064; E04H 4/0018; E04H 4/0025; E04H 4/0031; E04H 4/0037; E04H 4/0043; E04H 4/005; A63H 33/32
See application file for complete search history.

(56) References Cited

U.S. PATENT DOCUMENTS

| | | | | |
|---|---|---|---|---|
| 545,243 | A | * | 8/1895 | Miller ...................... A47K 3/06 5/98.1 |
| 2,689,812 | A | * | 9/1954 | Mollica .................. B29D 22/02 156/251 |
| 2,838,768 | A | * | 6/1958 | Fischett .................... A47K 1/14 297/DIG. 8 |
| 2,950,484 | A | * | 8/1960 | Jaffe ....................... A47K 3/064 5/98.1 |
| 5,603,129 | A | * | 2/1997 | Chou .................... E04H 4/0025 220/666 |
| 6,021,915 | A | * | 2/2000 | Shimozono ........... E04H 4/0025 220/666 |
| D956,267 | S | * | 6/2022 | Zhang ......................... D21/815 |
| D967,321 | S | * | 10/2022 | Jiang ........................... D21/815 |

* cited by examiner

*Primary Examiner* — Erin Deery
(74) *Attorney, Agent, or Firm* — Georgi Korobanov

(57) ABSTRACT

A polygonal one-piece foldable water basin, comprising a water basin body, wherein the water basin body is connected with at least one water outlet, a supporting frame is provided at an inner side of the water outlet close to an edge thereof, a tarpaulin is provided in an outer side of the water basin body; the tarpaulin comprises a mesh and a base cloth; the base cloth is made of high strength terylene and/or chinlon, coated with PVC paste at both sides thereof and dried; the mesh is a high strength square mesh, and the mesh is connected and welded to the base cloth by high temperature processes to form the tarpaulin; by providing the tarpaulin at an outer portion of the water basin the water basin is reinforced, the tarpaulin is provided with the high strength square mesh, the mesh is inelastic and enclosed in the tarpaulin.

5 Claims, 8 Drawing Sheets

POLYGONAL ONE-PIECE FOLDABLE WATER BASIN

TECHNICAL FIELD

The present invention relates to the technical field of water basins, especially a polygonal one-piece foldable water basin.

BACKGROUND TECHNOLOGY

Water basins are containers for housing water, and for washing a pet, it is necessary to use a water basin, therefore, a foldable water basin is desired, which makes it convenient for use and subsequent storage.

One-piece foldable water basins currently available are made of PVC materials, as the PVC materials are flexible in nature, when more and more water is infused, force that an inner wall of the water basin is subject to is bigger and bigger, so that the inner wall of the water basin is forced to extend, as a result, with the increase of load of the water basin, a surrounding portion of the water basin is stretched, and an outer wall of the water basin is increasingly inclined; and with ongoing of water filling, an outer portion of the water basin is gradually inclining, and a surrounding part of the water basin is liable to split due to the heavy load exerted thereon, which goes against use and beauty of the water basin.

SUMMARY OF INVENTION

A purpose of the present invention is to provide a polygonal one-piece foldable water basin, to solve the problems raised in the background technology that the outer portion of the water basin currently available is liable to split when subjected to a heavy load.

To achieve the foregoing purpose, the present invention provides the following technical solution:

A polygonal one-piece foldable water basin, comprising a water basin body, at least one water outlet is provided at the water basin body close to a bottom portion thereof, a supporting frame is provided at an inner wall of the at least one water outlet close to an edge thereof, a long pole is provided in and penetrates through a surface of the supporting frame, and the long pole engages with the supporting frame by sliding, a circular plate is fixed at an end of the long pole; a water feeding mechanism is provided at a top surface of the water basin body, the water basin body is made of terylene, a PTFE film is provided on an outer surface of the water basin body and a tarpaulin is provided at an outer side of the water basin body.

On the basis of the foregoing technical solution, the present invention provides the following optional technical solutions:

In one of the optional technical solutions: a handle is provided at an end portion of the long pole away from the circular plate, and the handle is made of PP plastic.

In one of the optional technical solutions: at least one tension spring is provided between the handle and the supporting frame, and a size of the circular plate is the same as a size of the at least one water outlet.

In one of the optional technical solutions: anti-skid grooves are provided at a bottom surface at an inner side of the water basin body, wherein the anti-skid grooves are distributed circumferentially in the bottom surface at the inner side of the water basin body.

In one of the optional technical solutions: the anti-skid grooves are hexagonal, and the circular plate is made of natural rubber.

In one of the optional technical solutions: the water feeding mechanism comprises an arc-shaped groove, wherein the arc-shaped groove is provided at the top surface of the water basin body, a standing groove is provided at an inner surface of the arc-shaped groove and at least one anti-skid mat is provided at an inner side of the standing groove.

In one of the optional technical solutions: bulges are circumferentially provided at a surface of the at least one anti-skid mat, and the at least one anti-skid mat is made of nitrile rubber.

In one of the optional technical solutions: the tarpaulin comprises a mesh and a base cloth.

In one of the optional technical solutions: the base cloth is made of high strength terylene and/or chinlon, wherein the base cloth is coated with PVC paste at both sides and drying.

In one of the optional technical solutions: the mesh is a high density square mesh, wherein the mesh is fixed and welded to the base cloth by high temperature processes so that the tarpaulin is formed.

In one of the optional technical solutions: the mesh is made of inelastic materials.

Compared with the prior art, the present invention has the following beneficial effects:

In the present invention, the outer side of the water basin is reinforced by providing the tarpaulin at the outer side of the water basin, high strength square mesh with a high density is provided in the tarpaulin, so the water basin is not liable to deform; the mesh is made of inelastic materials and enclosed in the tarpaulin, so that, after injecting water in the water basin, the inner wall of the water basin is not liable to deform due to support of the tarpaulin, a diameter of the water basin can be infinitely large, and a 1.8-meter-limit in the art can be broken through.

Figure 1:
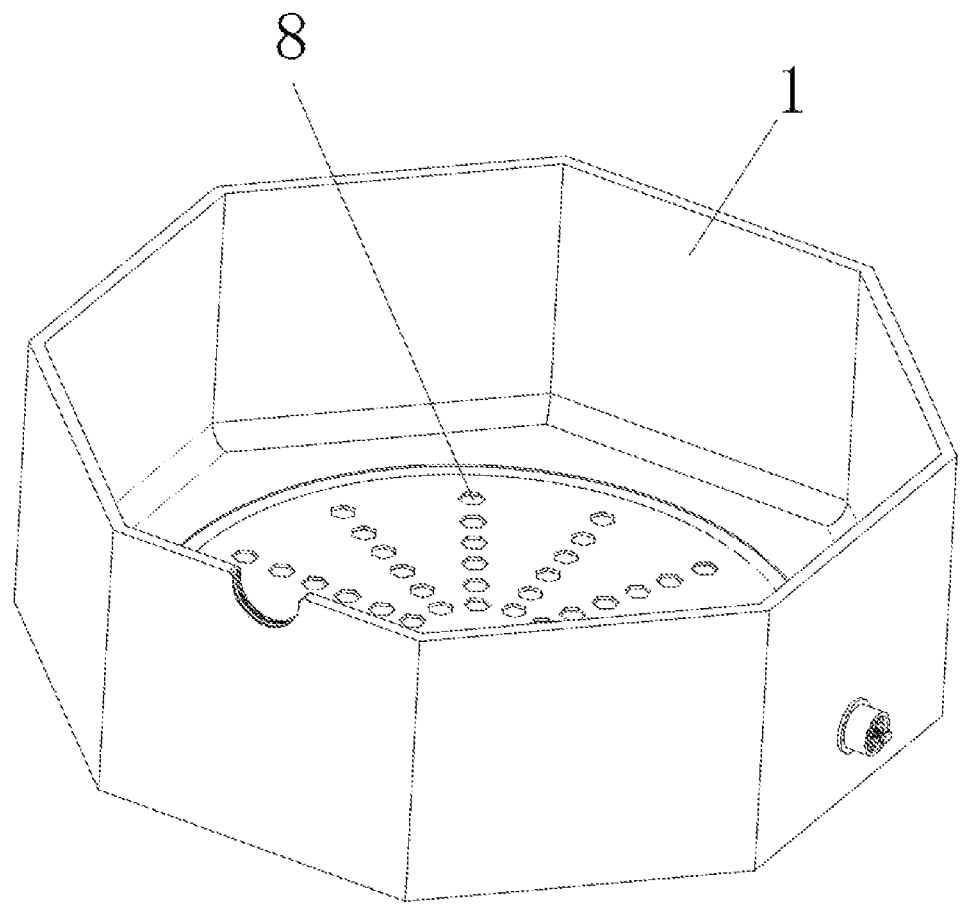
FIG. 1 is a front view showing the polygonal one-piece foldable water basin proposed in the present invention.

In the drawings: 1. water basin body; 2. water outlet; 3. supporting frame; 4. long pole; 5. circular plate; 6. handle;

7. tension spring; 8. anti-skid groove; 9. arc-shaped groove; 10. standing groove; 11. anti-skid groove; 12. tarpaulin; and 13. mesh.

EMBODIMENTS

In order to illustrate the purposes, features and advantages of the present invention more clearly, hereinafter the present invention will be further described in conjunction with the drawings and the embodiments. It is to be explained that, on the basis of no contradiction, embodiments of the present invention and features in the embodiments of the present invention can be combined.

A lot of specific embodiments have been set forth in the following description to help fully understanding of the present invention, however, the present invention can be implemented by ways other than those described herein, therefore, the present invention is not limited to the following specific embodiments.

Figure 2:
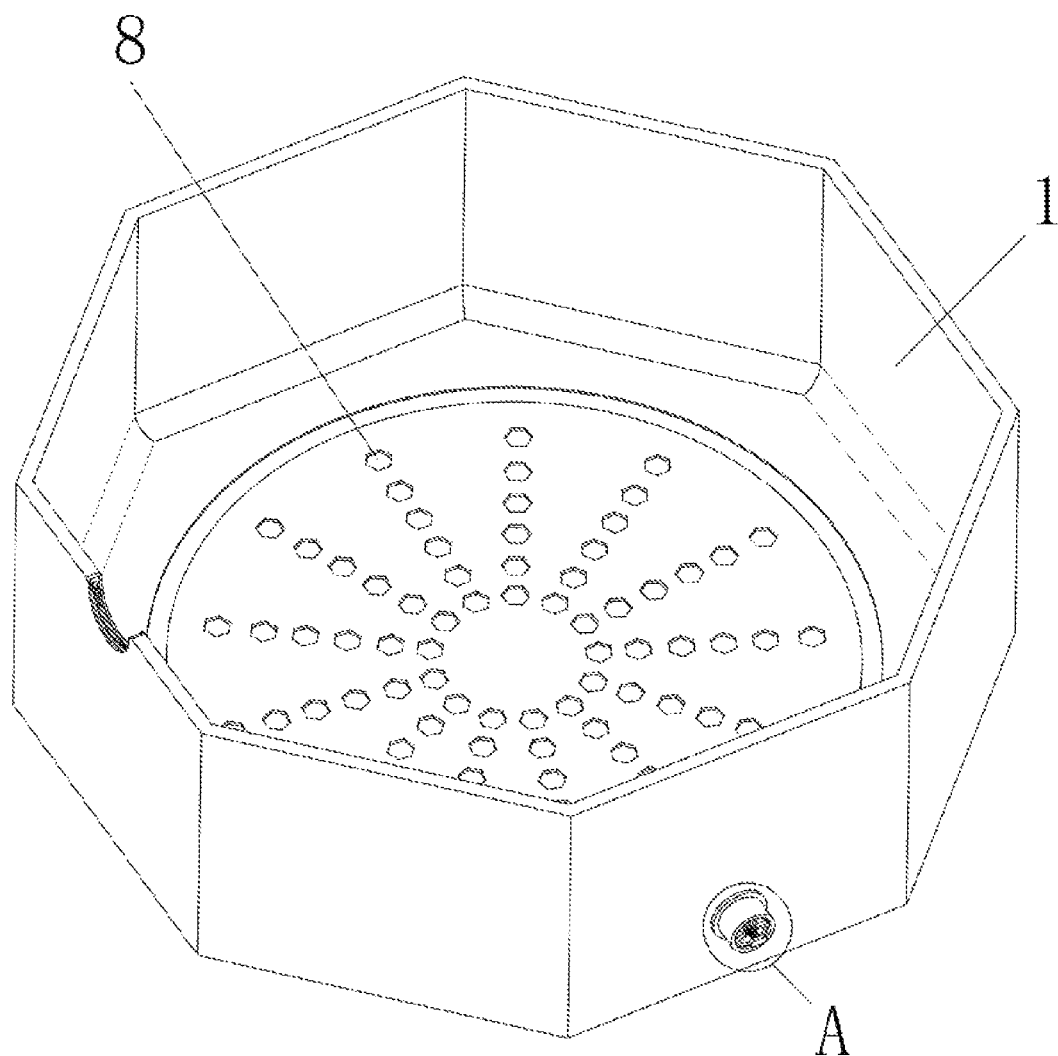
FIG. 2 is a top view showing the polygonal one-piece foldable water basin proposed in the present invention.
Figure 3:
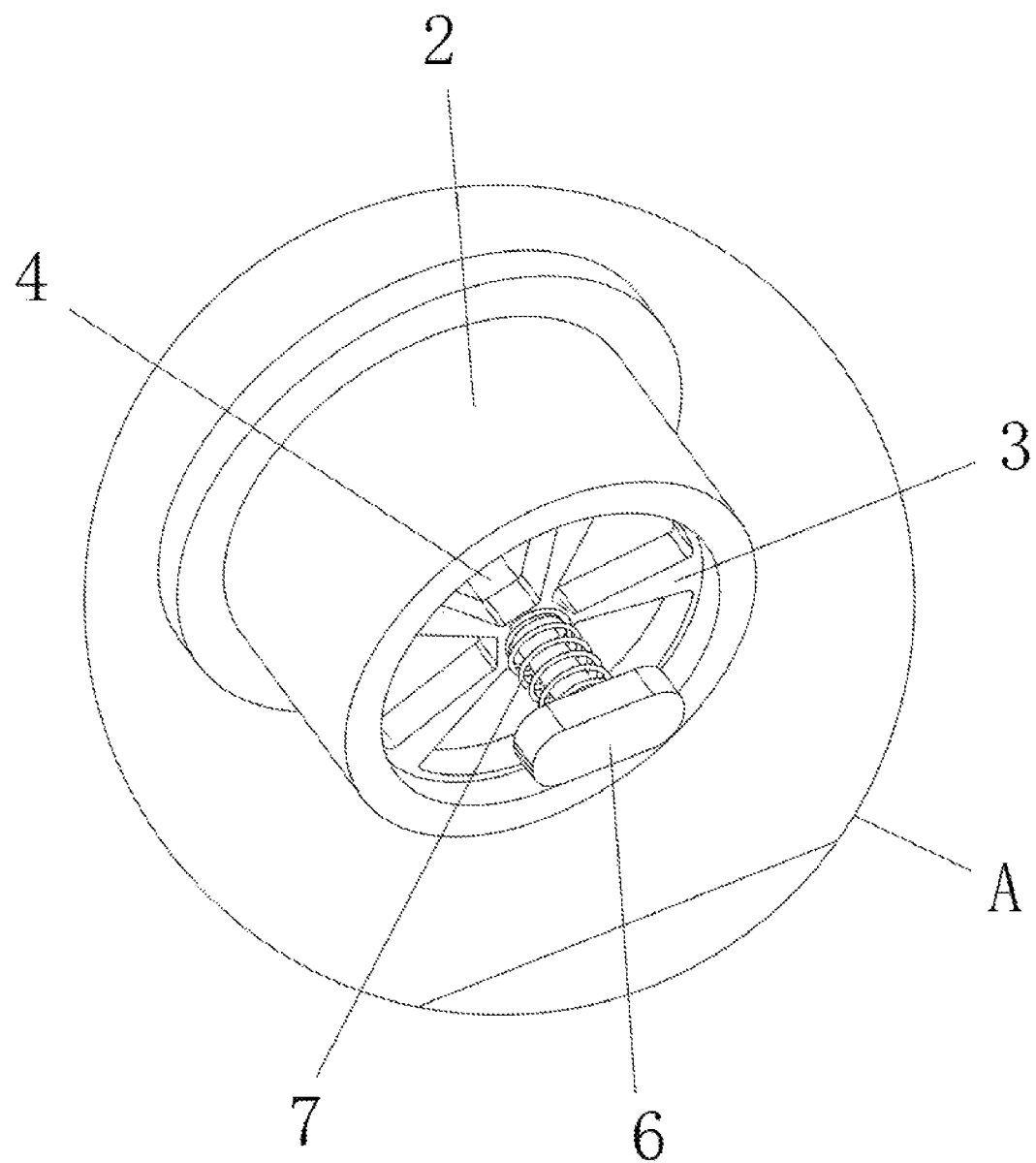
FIG. 3 is a partially enlarged view of a part A in FIG. 2 showing the polygonal one-piece foldable water basin proposed in the present invention.
Figure 4:
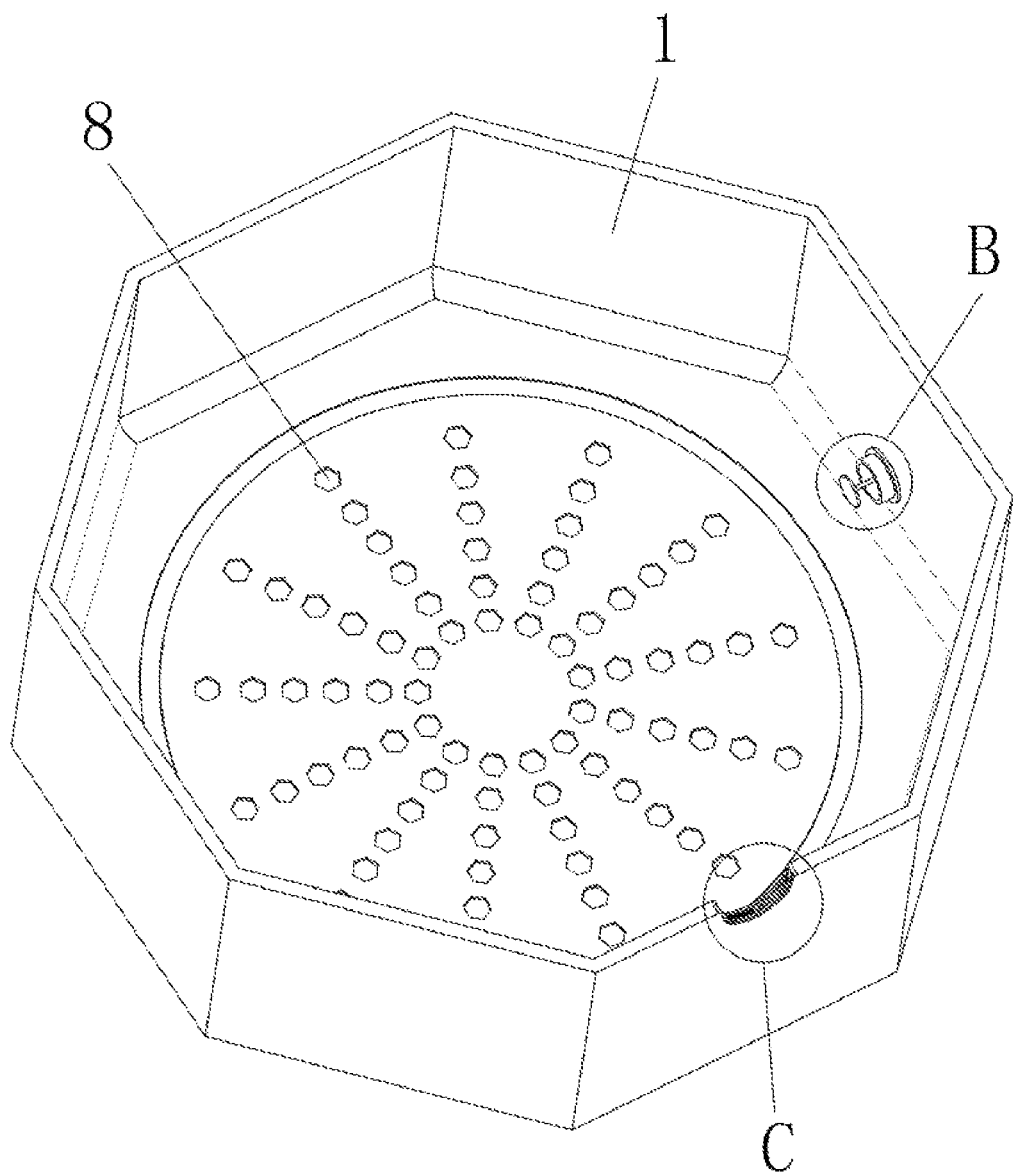
FIG. 4 is a side view showing the polygonal one-piece foldable water basin proposed in the present invention.
Figure 5:
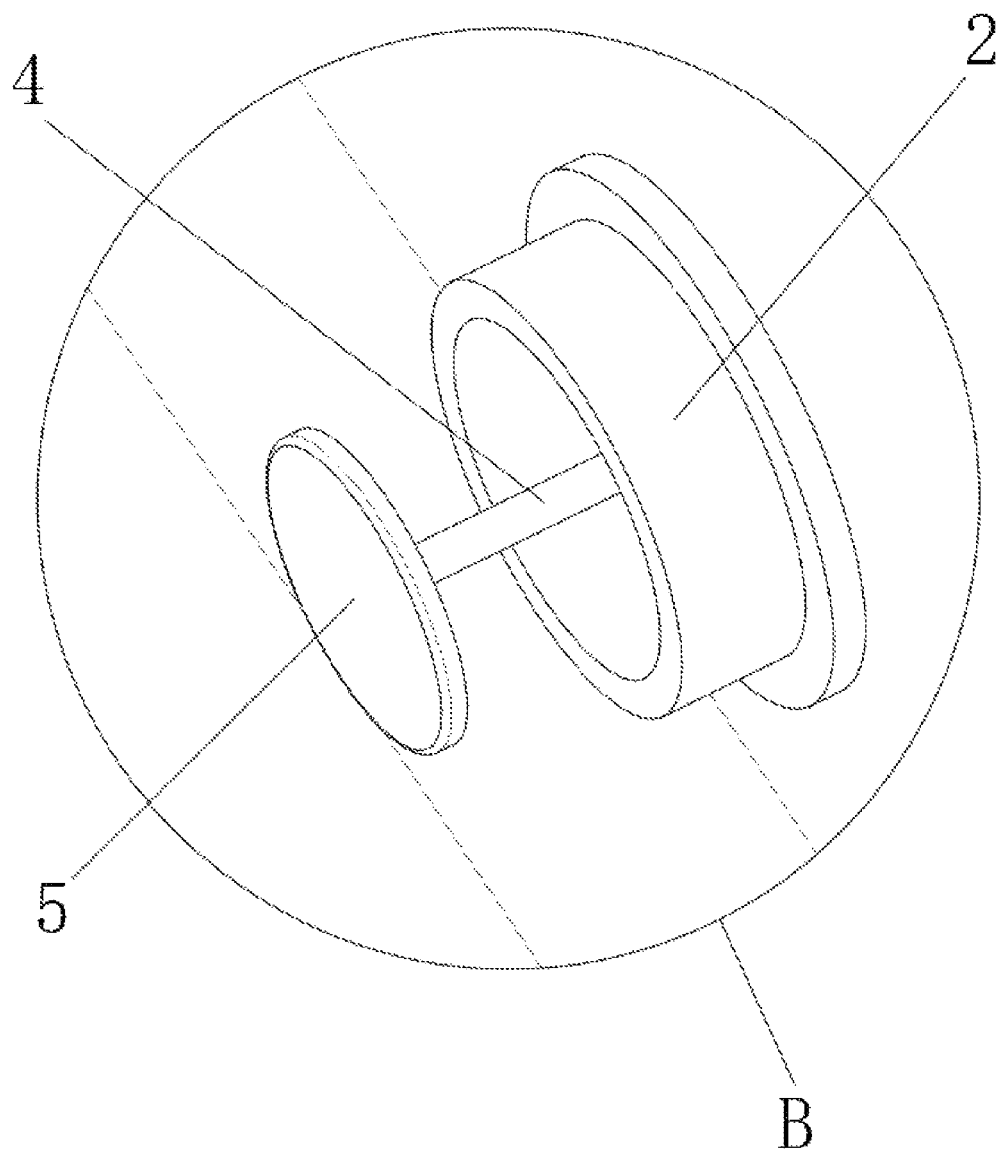
FIG. 5 is a partially enlarged view of a part B in FIG. 4 showing the polygonal one-piece foldable water basin proposed in the present invention.
Figure 6:
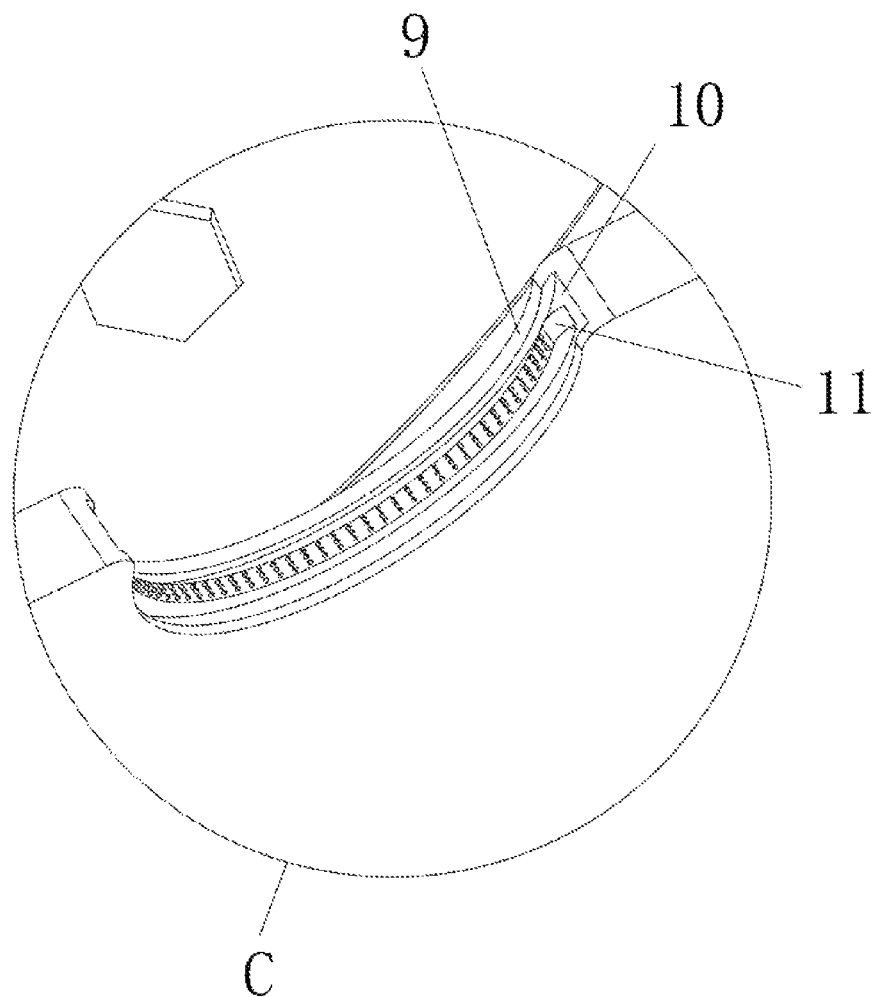
FIG. 6 is a partially enlarged view of a part C in FIG. 4 showing the polygonal one-piece foldable water basin proposed in the present invention.
Figure 7:
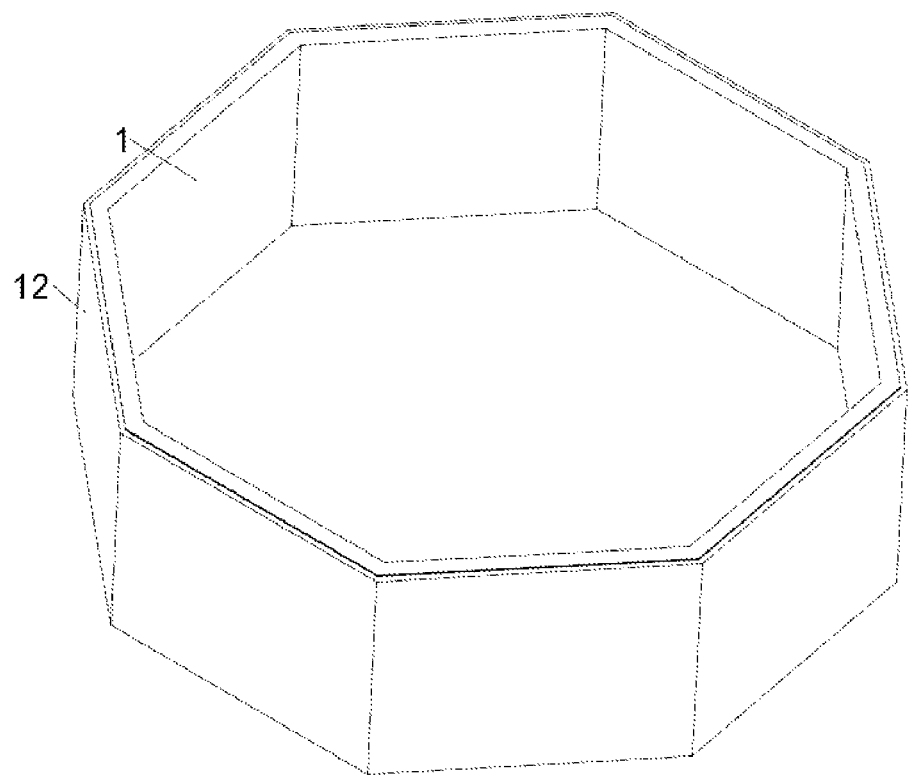
FIG. 7 is a diagram showing the tarpaulin in the polygonal one-piece foldable water basin proposed in the present invention.
Figure 8:
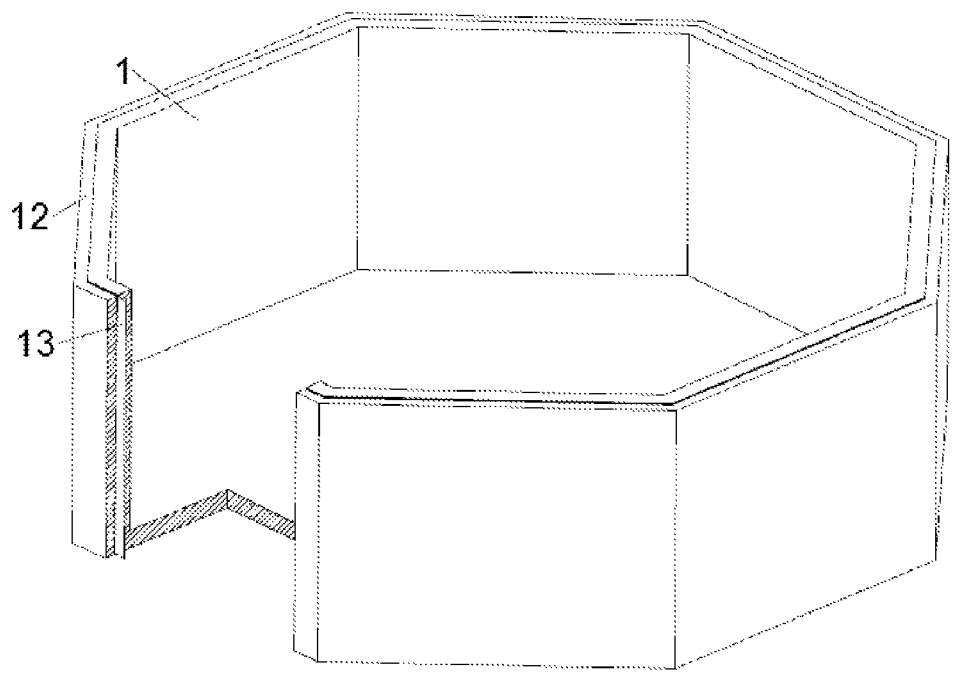
FIG. 8 is a sectional view showing the polygonal one-piece foldable water basin proposed in the present invention.
Figure 9:
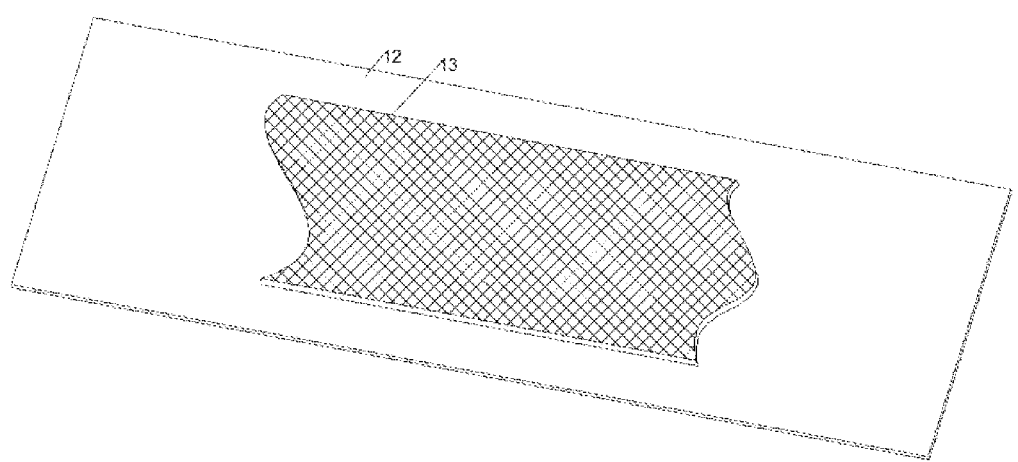
FIG. 9 is a diagram showing the mesh in the polygonal one-piece foldable water basin proposed in the present invention.

With reference to FIG. 1 to FIG. 9, the present invention provides the following technical solution: a polygonal one-piece foldable water basin, comprising a water basin body 1, a water outlet 2 is provided at a surface of the water basin body 1 close to an bottom end portion thereof, a supporting frame 3 is provided at an inner side of the water outlet 2 close to an edge thereof, a long pole 4 is provided in and penetrates through a surface of the supporting frame 3, wherein the long pole 4 engages with the supporting frame 3 by sliding, a circular plate 5 is provided at an end of the long pole 4, and the circular plate 5 is made of natural rubber, the water basin body 1 is made of terylene, which is cheap and soft, when it is necessary to fold the water basin body 1, by pressing the water basin body 1 forcefully the water basin body 1 can be folded, which makes it convenient to carry the same, furthermore, a PTFE film is provided at an outer surface of the water basin body 1, as waterproof effects of the PTFE film are good, water leakage can be prevented, and by providing the circular plate 5 it is possible to clear the water outlet 2 by pulling a handle 6 when it is jammed, which is simple and easy to learn.

A tarpaulin 12 is provided at an outer side of the water basin body 1, so that the water basin is packaged in the PVC tarpaulin 12, which is a kind of cloth made from high strength terylene or chinlon as a base cloth, coated with PVC paste, and formed by drying processes, so that the surface is reliable and strong.

A water feeding mechanism is provided at a top surface of the water basin body 1, wherein the water feeding mechanism comprises an arc-shaped groove 9 provided on a top surface of the water basin body 1, a standing groove 10 is provided at an inner side of the arc-shaped groove 9, an anti-skid mat 11 is provided on an inner side of the standing groove 10; when it is necessary to fill water in the water basin body 1, just connect a hose to a tap, and place the hose in the arc-shaped groove 9, turn on the tap, water filling can be done, in the meantime, as the anti-skid mat 11 is provided on the inner side of the standing groove 10, and the anti-skid mat 11 is of a high friction force, the hose can be placed stably without falling off accidentally.

Bulges are circumferentially provided on a surface of the anti-skid mat 11, and by providing the bulges on the anti-skid mat 11, friction can be further increased, so that the hose can be fixed more firmly; the anti-skid mat 11 is made of nitrile rubber, which is of a high friction force and can support the hose firmly.

The handle 6 is provided on an end of the long pole 4 away from the circular plate 5, and by the handle 6 the long pole 4 can be moved conveniently, the handle 6 is made of PP plastic, which is endurable and cheap.

At least one tension spring 7 is provided between the handle 6 and the supporting frame 3, and a size of the circular plate 5 is the same as a size of the water outlet 2, when jamming occurs during discharging water through the water outlet 2, by pulling the handle 6, which drives the long pole 4 to move, the circular plate 5 is driven to move subsequently, the circular plate 5 will enter the water outlet 2 and rub against an inner surface of the water outlet 2, by rubbing and movement of the circular plate 5, dirt can be removed from the water outlet, after that, release the handle 6, due to tension of the tension spring 7, the handle 6 is driven to move, the long pole 4 is driven to move subsequently and the circular plate 5 is resumed to an original position by the long pole 4.

Anti-skid grooves 8 are circumferentially provided at an bottom surface of the water basin body 1, the anti-skid grooves 8 serve to prevent skidding, especially during bathing of a pet, the anti-skid grooves 8 can prevent falling over of the pet due to the slippery surface, wherein the anti-skid grooves 8 are hexagonal.

The tarpaulin 12 comprises a mesh 13 and a base cloth 14; wherein the base cloth 14 is made of high strength terylene and/or chinlon, coated with PVC paste at both sides and dried; the mesh 13 is made of a high strength square mesh, and the mesh 13 is fixed and welded to the base cloth 14 by high temperature processes and the tarpaulin 13 is formed; the mesh 13 is made of inelastic materials; the mesh 13 is of a high density, and not liable to deform, when fixing and welding the mesh 13 with the PVC material on a surface of the base cloth 14 by high temperature processes and high radiofrequency presses, as the mesh 13 is not inelastic, the inner side of the water basin is not liable to deform due to increase of water mass, so that, a diameter of the water basin can be increase infinitely and a limit in the art of 1.8 meters can be broken through.

For the polygonal one-piece foldable water basin provided in the foregoing embodiment of the present invention, by providing the tarpaulin 12 with a reinforcing function at the outer side of the water basin, and providing a high density square mesh inside the tarpaulin 12, which is not liable to deform, the mesh 13 is made of inelastic materials and encapsulated in the tarpaulin 12, after filling water in the water basin, due to reinforcement of the tarpaulin 12 the inner side of the water basin is not liable to deform due to increased weight, so that a diameter of the water basin can be infinitely large, and a limit of 1.8 meters in the art can be broken through.

The foregoing is only a preferred embodiment of the present invention, rather than a limitation in other forms to the present invention, it is possible for those skilled in the art to change or modify the foregoing technical contents to be equivalent embodiments and apply the same to other fields, any simple modifications, equivalent replacements and improvements to the foregoing embodiment based on technical substances of the present invention without departing from technical contents of the present invention shall fall in the protection scope of the technical solutions of the present invention.

I claim:

1. A polygonal one-piece foldable water basin, comprising a water basin body, at least one water outlet is provided at the water basin body, a supporting frame is provided at an inner wall of the at least one water outlet adjacent to an edge thereof, an elongated rod is provided in and penetrates through a surface of the supporting frame, and the elongated rod slidably engages with the supporting frame, a circular plate is fixed at an end of the elongated rod; a water feeding mechanism is provided at a top surface of the water basin body, the water basin body is made of terylene, a PTFE film is provided on an outer surface of the water basin body and a tarpaulin is provided at an outer side of the water basin body.

2. The polygonal one-piece foldable water basin the tarpaulin according to claim 1, wherein the tarpaulin comprises a mesh and a base cloth and the mesh is enclosed in the base cloth.

3. The polygonal one-piece foldable water basin the tarpaulin according to claim 2, wherein the base cloth is made of terylene and/or chinlon, wherein the base cloth has a PVC coating on both sides.

4. The polygonal one-piece foldable water basin the tarpaulin according to claim 2, wherein the mesh is a square mesh, wherein the mesh is welded to the base cloth so that the tarpaulin is formed.

5. The polygonal one-piece foldable water basin the tarpaulin according to claim 2, wherein the mesh is made of inelastic materials.

\* \* \* \* \*